(12) United States Patent
Yoshida (10) Patent No.: US 6,181,877 B1
(45) Date of Patent: Jan. 30, 2001

(54) RANGEFINDER APPARATUS

(75) Inventor: Hideo Yoshida, Saitama (JP)

(73) Assignee: Fuji Photo Optical Co., Ltd., Saitama (JP)

( * ) Notice: Under 35 U.S.C. 154(b), the term of this patent shall be extended for 0 days.

(21) Appl. No.: 09/413,234

(22) Filed: Oct. 7, 1999

(30) Foreign Application Priority Data

Oct. 8, 1998 (JP) .................................................. 10-287020

(51) Int. Cl.$^7$ .............................. G03B 13/36; G01C 3/08
(52) U.S. Cl. ......................... 396/106; 396/120; 356/3.04
(58) Field of Search .................................... 396/106, 120; 356/3.04, 3.05

(56) References Cited

U.S. PATENT DOCUMENTS

| Re. 35,652 | * 11/1997 | Nonaka et al. | .................. 396/106 X |
| 5,493,362 | * 2/1996 | Nonaka | ................................. 396/106 |
| 6,026,246 | 2/2000 | Yoshida et al. | ...................... 396/106 |

FOREIGN PATENT DOCUMENTS

| 63-1918 | 1/1988 | (JP) . |
| 1-224617 | 9/1989 | (JP) . |
| 8-94919 | 4/1996 | (JP) . |
| 8-94920 | 4/1996 | (JP) . |

* cited by examiner

*Primary Examiner*—W. B. Perkey
(74) *Attorney, Agent, or Firm*—Leydig, Voit & Mayer, Ltd (57) ABSTRACT

In a rangefinder apparatus, a clamping circuit receives a far-side signal $I_2$ output from a first signal processing circuit and outputs a signal $I_{2c}$ having a greater value than a clamp signal $I_c$ and the far-side signal $I_2$. An arithmetic circuit receives a near-side signal $I_1$ output from a second signal processing circuit and the signal $I_{2c}$ output from the clamping circuit, calculates an output ratio $(I_1/(I_1+I_{2c}))$, and outputs an output ratio signal. An integrating circuit receives the output ratio signal and, together with an integrating capacitor, integrates the output ratio signal several times. When switching the level of the clamp signal $I_c$ before subsequent distance measuring operations in a continuous distance measurement, a clamp level switching circuit adds a value to the clamp signal, setting a new level.

3 Claims, 11 Drawing Sheets

| CLALV SIGNAL PULSE NUMBER | OUTPUT OF CLAMP LEVEL SWITCHING CIRCUIT | | | | CLAMP SIGNAL (nA) |
|---|---|---|---|---|---|
| | Q4 | Q3 | Q2 | Q1 | |
| 0 | 0 | 0 | 0 | 0 | 0.000 |
| 1 | 0 | 0 | 0 | 1 | 0.125 |
| 2 | 0 | 0 | 1 | 0 | 0.250 |
| 3 | 0 | 0 | 1 | 1 | 0.375 |
| 4 | 0 | 1 | 0 | 0 | 0.500 |
| 5 | 0 | 1 | 0 | 1 | 0.625 |
| 6 | 0 | 1 | 1 | 0 | 0.750 |
| 7 | 0 | 1 | 1 | 1 | 0.875 |
| 8 | 1 | 0 | 0 | 0 | 1.000 |
| 9 | 1 | 0 | 0 | 1 | 1.125 |
| 10 | 1 | 0 | 1 | 0 | 1.250 |
| 11 | 0 | 0 | 0 | 0 | 1.375 |
| 12 | 1 | 1 | 0 | 0 | 1.500 |
| 13 | 1 | 1 | 0 | 1 | 1.625 |
| 14 | 1 | 1 | 1 | 0 | 1.750 |
| 15 | 1 | 1 | 1 | 1 | 1.875 |
| 16 | 0 | 0 | 0 | 0 | 0.000 |
| 17 | 0 | 0 | 0 | 1 | 0.125 |
| ⋮ | | | | | |

Fig.10A EXAMPLE

Fig.10B REFERENCE EXAMPLE

Fig.11A

EXAMPLE

Fig.11B

REFERENCE
EXAMPLE

RANGEFINDER APPARATUS

BACKGROUND OF THE INVENTION

1. Field of the Invention

The present invention relates to a rangefinder apparatus for measuring the distance to an object to be measured; and, in particular, to an active type rangefinder apparatus suitably used in a camera or the like.

2. Related Background Art

In active type rangefinder apparatus used in cameras and the like, an infrared light-emitting diode (IRED) projects a luminous flux toward an object to be measured, the reflected light of thus projected luminous flux is received by a position sensitive detector (PSD), a signal outputted from the PSD is arithmetically processed by a signal processing circuit and an arithmetic circuit and then is outputted as distance information, and the distance to the object is detected by a central processing unit (CPU). In general, since errors may occur when the distance is measured upon a single light-projecting operation, light is projected a plurality of times so as to obtain a plurality of distance information items, which are then integrated by an integrating circuit and averaged.

Figure 1:
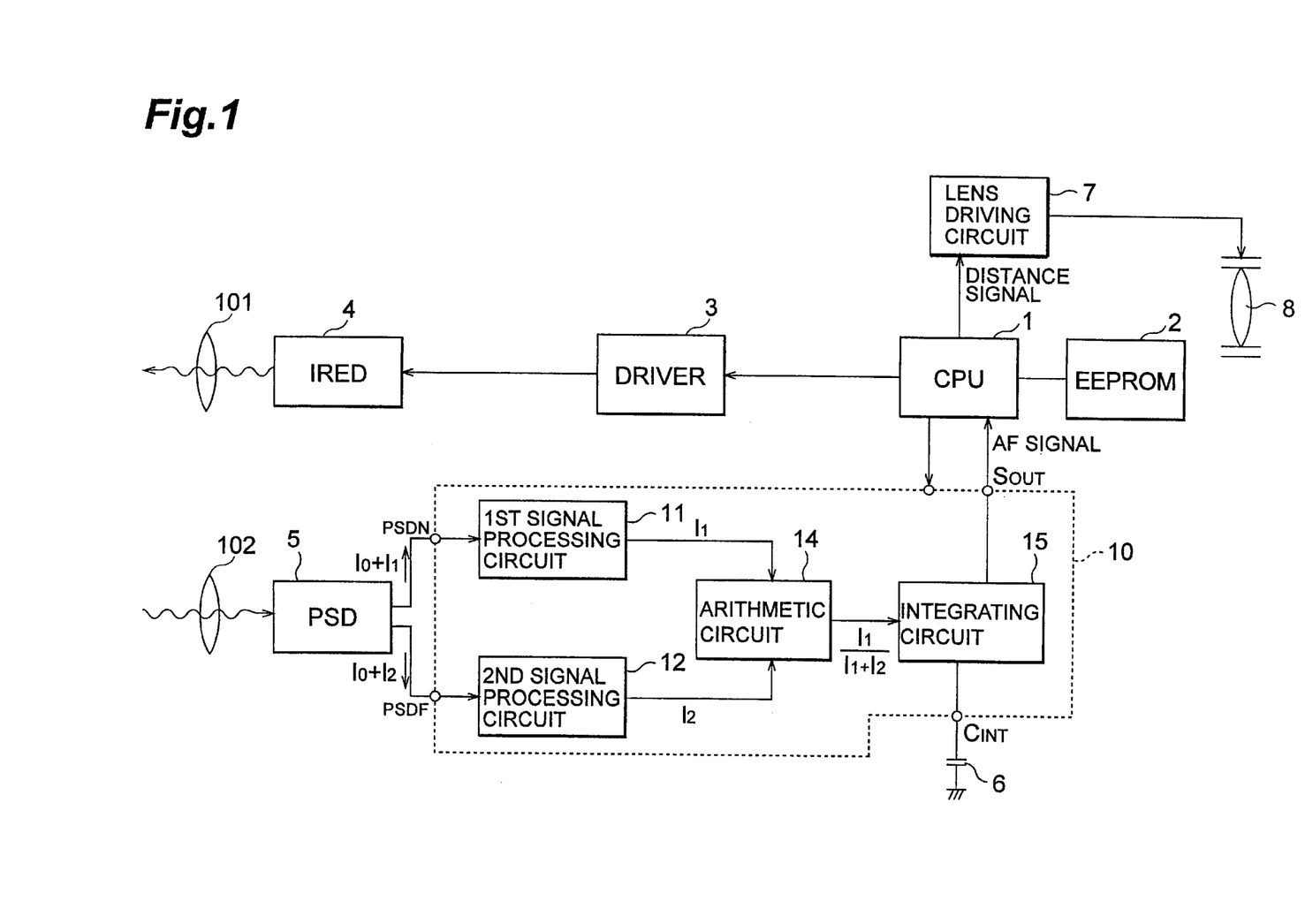
FIG. 1 is a configurational view of the rangefinder apparatus in accordance with the first prior art.

As such an active type rangefinder apparatus, one shown in FIG. 1 has conventionally been known. FIG. 1 is a configurational view of a rangefinder apparatus in accordance with first prior art.

In the rangefinder apparatus shown in this drawing, a CPU 1 controls individual elements according to a program stored in an electrically erasable and programmable read-only memory (EEPROM) 2 and, under the control of the CPU 1, a driver 3 drives an IRED 4 so as to make it output infrared light, which is then projected through a projection lens 101 to an object to be measured. The infrared light reflected by the object is collected by a PSD 5 by way of a light-receiving lens 102, and the PSD 5 outputs two signals $I_1$ and $I_2$ according to the position at which the reflected light of the infrared light is received. A first signal processing circuit 11 eliminates a steady-state light component contained in the signal $I_1$ which becomes a noise, whereas a second signal processing circuit 12 eliminates a steady-state light component contained in the signal $I_2$ which becomes a noise.

According to the signals $I_1$ and $I_2$ from which the steady-state light components have been eliminated, an arithmetic circuit 14 determines an output ratio ($I_1/(I_1+I_2)$) by an arithmetic operation, and outputs an output ratio signal corresponding to the distance to the object. An integrating circuit 15 integrates at an integrating capacitor 6 the output ratio signals thus outputted from the arithmetic circuit 14 a plurality of times, thereby improving the S/N ratio. The signal outputted from this integrating circuit 15 (hereinafter referred to as "AF signal") corresponds to the distance to the object. Then, according to the AF signal outputted from the integrating circuit 15, the CPU 1 determines a distance signal by carrying out a predetermined arithmetic operation, and controls a lens driving circuit 7 according to this distance signal, so as to move a lens 8 to an in-focus position.

Figure 2:
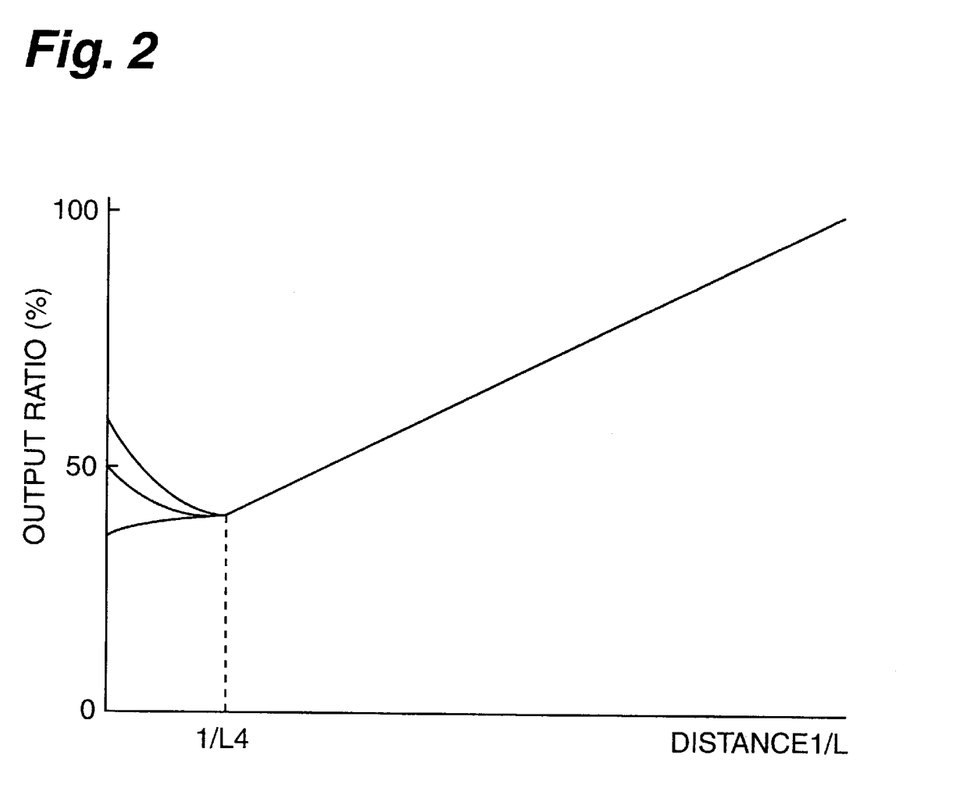
FIG. 2 is a graph showing the relationship between the AF signal outputted from the integrating circuit in the first prior art and the distance to the object to be measured.

FIG. 2 is a graph showing the relationship between the AF signal outputted from the integrating circuit 15 in this first prior art and the distance to the object. In this graph, the abscissa indicates the reciprocal (1/L) of the distance L to the object, whereas the ordinate indicates the output ratio ($I_1/(I_1+I_2)$), i.e., AF signal. As shown in this graph, the output ratio has substantially a linear relationship with respect to the reciprocal (1/L) of the distance L at a certain distance $L_4$ or less, such that the output ratio decreases as the distance L is longer (1/L is smaller). At the distance $L_4$ or greater, by contrast, the influence of the steady-state light component increases as the distance L is greater. Letting $I_n$ ($I_n \geq 0$) be the steady-state light component, the output ratio is $(I_1+I_n)/(I_1+I_n+I_2+I_n)$ whereby the output ratio would shift so as to increase at the distance $L_4$ or greater. Also, since $I_n$ occurs randomly, it becomes unstable depending on the distance measuring condition. It is due to the fact that, as the distance L increases, the intensity of reflected light received by the PSD 5 decreases, whereby the steady-state light component $I_n$ becomes relatively greater. If such a phenomenon occurs, the distance to the object L cannot be determined uniquely from the output ratio.

Figure 3:
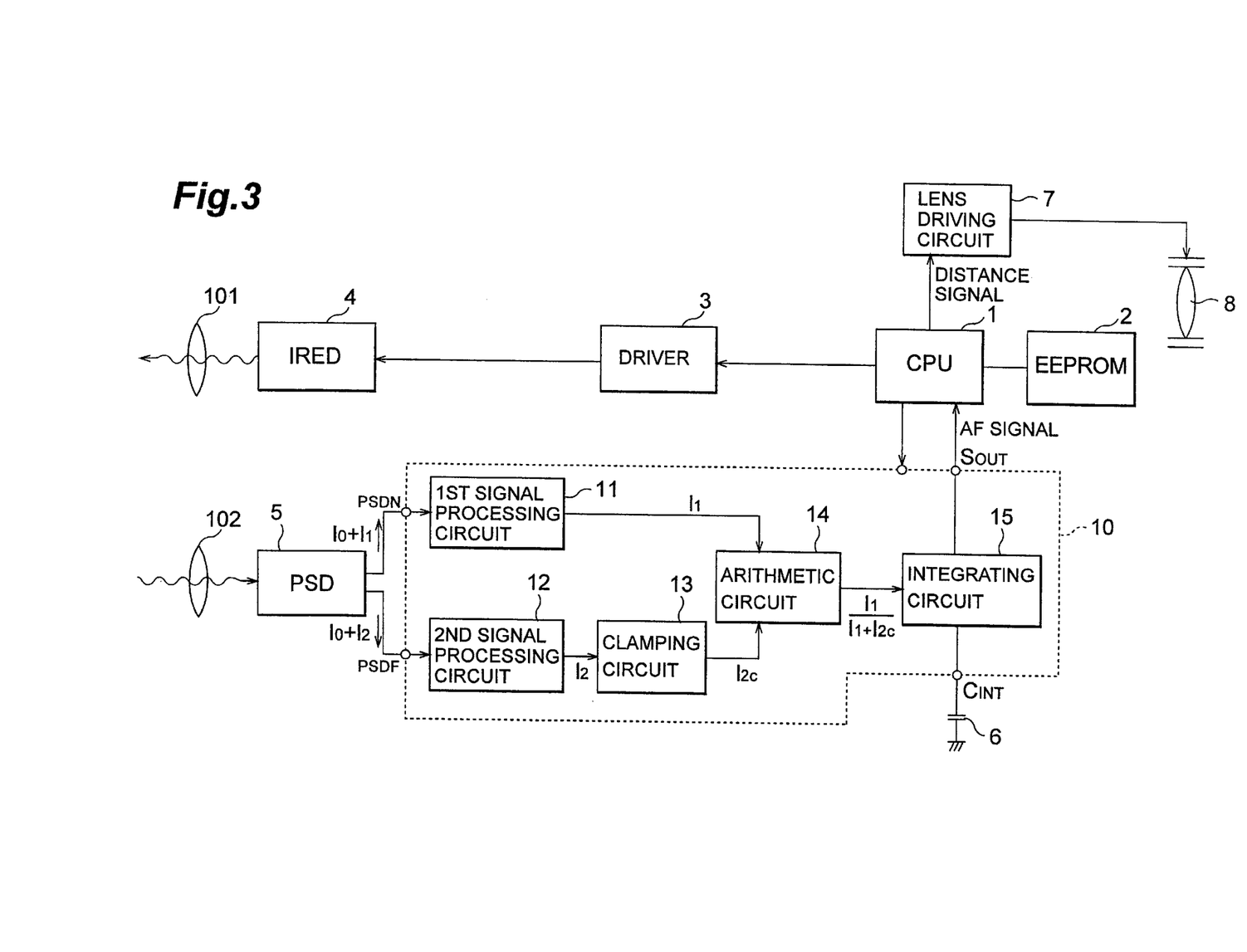
FIG. 3 is a configurational view of the rangefinder apparatus in accordance with the second prior art.

Therefore, as a rangefinder apparatus overcoming such a problem, one which will be explained in the following has been known. FIG. 3 is a configurational view of the rangefinder apparatus in accordance with second prior art. In the rangefinder apparatus in accordance with the second prior art, a clamping circuit 13 is disposed between the second signal processing circuit 12 and arithmetic circuit 14 in the rangefinder apparatus in accordance with the first prior art. The clamping circuit 13 inputs therein the signal $I_2$ outputted from the second signal processing circuit 12, compares a clamp signal $I_c$ having a certain constant level and the signal $I_2$ with each other in terms of magnitude of their levels, and outputs the clamp signal $I_c$ if the former is greater and outputs the signal $I_2$ as it is if not. Namely, the arithmetic circuit 14 outputs the output ratios ($I_1/(I_1+I_2)$) and ($I_1/(I_1+I_c)$) when the distance L to the object is shorter and longer, respectively.

Figure 4:
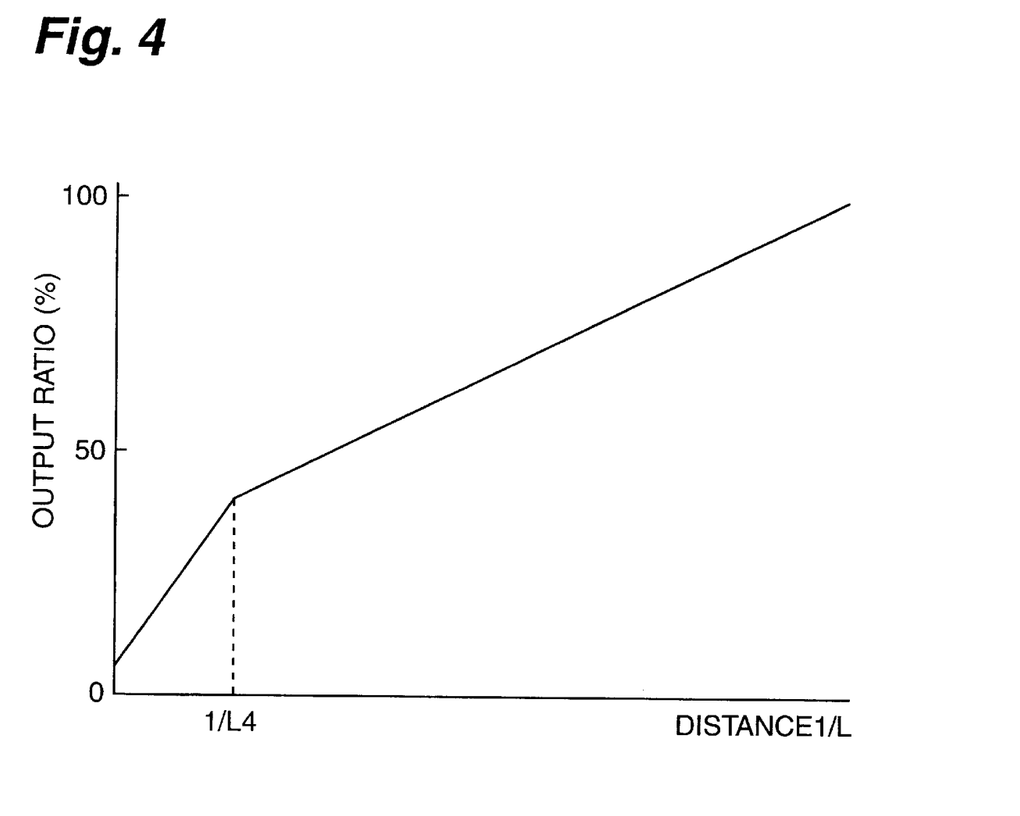
FIG. 4 is a graph showing the relationship between the AF signal outputted from the integrating circuit in the second prior art and the distance to the object to be measured.

FIG. 4 is a graph showing the relationship between the AF signal outputted from the integrating circuit 15 in this second prior art and the distance to the object. In this graph, the abscissa indicates the reciprocal (1/L) of the distance L to the object, whereas the ordinate indicates the output ratio, i.e., AF signal. As shown in this graph, in each of the respective ranges smaller and greater than a certain distance $L_4$, the output ratio has substantially a linear relationship with respect to the reciprocal (1/L) of the distance L, such that the output ratio decreases as the distance L is greater(1/L is smaller). As a consequence, the distance L to the object can be determined uniquely from the output ratio.

SUMMARY OF THE INVENTION

In the rangefinder apparatus in accordance with the second prior art (FIG. 3), however, when switching the level of the clamp signal $I_c$ in the clamping circuit 13, if the level is once initialized and then a new level is to be set, it will take time to switch these levels. Namely, the time for initializing the level of the clamp signal $I_c$ and the time, subsequent thereto, for setting a new level for the clamp signal $I_c$ are necessary.

This problem of clamp level switching time would be serious in particular when switching the levels of clamp signal during a continuous distance measurement in which a plurality of distance measuring operations are carried out in series. Examples thereof include the cases where the levels of clamp signal in distance measuring operations are switched according to results of their preceding distance measuring operations, where errors in distance measurements are determined from individual measured distance values obtained by distance measuring operations with respective values of level of the clamp signal, and the like. In such a continuous distance measurement, if it takes time to switch the level of the clamp signal $I_c$ upon the second or later distance measuring operation, then the time difference required for the period from the release operation until the exposure becomes longer. As a consequence, when a moving object (object to be measured) is to be photographed, for example, a photograph with a desirable composition may not be obtained.

In order to overcome the problems mentioned above, it is an object of the present invention to provide a rangefinder apparatus which takes only a short time to switch levels of a clamp signal.

The rangefinder apparatus in accordance with the present invention comprises: (1) light-projecting means for projecting a luminous flux toward an object to be measured; (2) light-receiving means for receiving reflected light of the luminous flux projected to the object at a light-receiving position on a position sensitive detector corresponding to a distance to the object and outputting, according to the light-receiving position, a far-side signal having a greater value as the distance is longer if the quantity of received light is constant, and a short-side signal having a greater value as the distance is shorter if the quantity of received light is constant; (3) clamping means for inputting therein the far-side signal, comparing the level of the far-side signal with the level of a clamp signal in terms of magnitude, and outputting the far-side signal as it is if the level of the far-side signal is at the level of the clamp signal or greater and outputting the clamp signal if not; (4) arithmetic means for calculating a ratio between the near-side signal and the signal outputted from the clamping means and outputting thus obtained output ratio signal; (5) integrating means for accumulating and integrating the output ratio signal and outputting an integrated signal corresponding to the result of integration; (6) detecting means for detecting a measured distance value according to the integrated signal; and (7) clamp level switching means for adding a predetermined value to an already set value so as to set a new level when switching the level of the clamp signal before the second or later distance measuring operation in a continuous distance measurement in which a plurality of distance measuring operations are carried out in series.

This rangefinder apparatus operates as follows. The luminous flux outputted from the light-projecting means toward the object to be measured is reflected by the object, this reflected light is received by the light-receiving means at the light-receiving position on the position sensitive detector corresponding to the distance to the object, and the far-side signal having a greater value as the distance is longer if the quantity of the received light is constant and the near-side signal having a greater value as the distance is shorter if the quantity of the received light is constant are outputted according to the light-receiving position. The clamping means compares the far-side signal with the clamp signal in terms of magnitude of their levels. Then, the far-side signal is outputted if the level of the far-side signal is not lower than that of the clamp signal; otherwise, the clamp signal is outputted. The arithmetic means calculates the ratio between the near-side signal and the signal outputted from the clamping means, thereby outputting the output ratio signal. The integrating means accumulates and integrates the output ratio signal, thereby outputting the integrated signal corresponding to the result of integration. According to the integrated signal outputted from the integrating means, the detecting means detects the measured distance value. Then, when switching the level of the clamp signal before the second or later distance measuring operation in a continuous distance measurement in which a plurality of distance measuring operations are carried out in series, the clamp level switching means adds a predetermined value to an already set value, so as to set a new level.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

In the following, an embodiment of the present invention will be explained in detail with reference to the accompanying drawings. Here, in the explanation of the drawings, constituents identical to each other will be referred to with letters or numerals identical to each other, without their overlapping descriptions being repeated. Also, the following explanation relates to a case where an active type rangefinder apparatus in accordance with this embodiment is employed as a rangefinder apparatus of an autofocus type camera.

Figure 5:
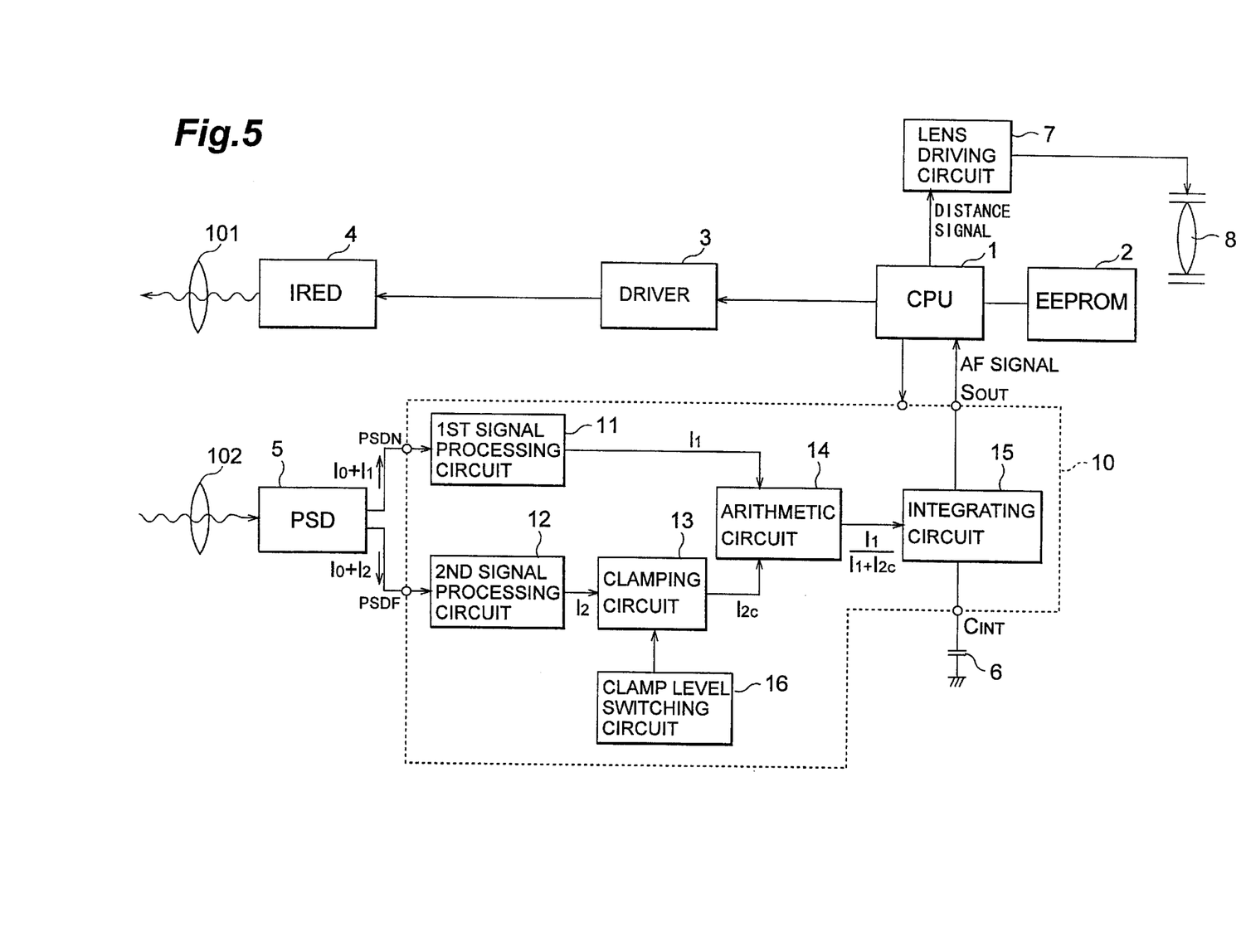
FIG. 5 is a configurational view of the rangefinder apparatus in accordance with an embodiment of the present invention.

First, the overall configuration of the rangefinder apparatus in accordance with this embodiment will be explained. FIG. 5 is a configurational view of the rangefinder apparatus in accordance with this embodiment.

A CPU 1 is used for controlling the whole camera equipped with this rangefinder apparatus, and controls the whole camera including the rangefinder apparatus according to a program and parameters prestored in an EEPROM 2. In the rangefinder apparatus shown in this drawing, the CPU 1 regulates a driver 3, so as to control the emission of infrared light from an IRED (infrared light-emitting diode) 4. Also, the CPU 1 controls actions of an autofocus IC (hereinafter referred to as "AFIC") 10, and inputs the AF signal outputted from the AFIC 10.

By way of a light-projecting lens 101 disposed at the front face of the IRED 4, the infrared light emitted from the IRED 4 is projected onto the object to be measured. The infrared light is partly reflected by the object, and the resulting reflected light is received, by way of a light-receiving lens 102 disposed at the front face of a PSD (position sensitive detector) 5, at a position on the light-receiving surface of the PSD 5. This light-receiving position corresponds to the distance to the object. Then, the PSD 5 outputs two signals $I_1$ and $I_2$ which correspond to the light-receiving position. The signal $I_1$ is a near-side signal which has a greater value as the distance is shorter if the quantity of received light is constant, whereas the signal $I_2$ is a far-side signal which has a greater value as the distance is longer if the quantity of received light is constant. The sum of the signals $I_1$ and $I_2$ represents the quantity of reflected light received by the PSD 5, whereas the output ratio $(I_1/(I_1+I_2))$ represents the light-receiving position on the light-receiving surface of the PSD 5, i.e., the distance to the object. The near-side signal $I_1$ is inputted to the PSDN terminal of the AFIC 10, whereas the far-side signal $I_2$ is inputted to the PSDF terminal of the AFIC 10. In practice, however, depending on external conditions, there are cases where respective signals in which a steady-state light component $I_0$ is added to the near-side signal $I_1$ and far-side signal $I_2$ are fed into the AFIC 10.

The AFIC 10 is an integrated circuit (IC) constituted by a first signal processing circuit 11, a second signal processing circuit 12, a clamping circuit 13, an arithmetic circuit 14, an integrating circuit 15, and a clamp level switching circuit 16. The first signal processing circuit 11 inputs therein a signal $I_1+I_0$ outputted from the PSD 5, and eliminates the steady-state light component $I_0$ therefrom, thereby outputting the near-side signal $I_1$; whereas the second signal processing circuit 12 inputs therein a signal $I_2+I_0$ outputted from the PSD 5, and eliminates the steady-state light component $I_0$ therefrom, thereby outputting the far-side signal $I_2$.

The clamping circuit 13 inputs therein the far-side signal $I_2$ outputted from the second signal processing circuit 12, compares a clamp signal $I_c$ having a certain level and the far-side signal $I_2$ in terms of the magnitude of their levels. If the former is greater than the latter, the clamp signal $I_c$ is outputted; otherwise, the far-side signal $I_2$ is outputted as it is. In the following, the signal outputted from the clamping circuit 13 is represented by $I_{2c}$. The clamp level switching circuit 16 switches the level of the clamp signal $I_c$ in the clamping circuit 13 according to an instruction from the CPU 1.

The arithmetic circuit 14 inputs therein the near-side signal $I_1$ outputted from the first signal processing circuit 11 and the signal $I_{2c}$ (the signal having a greater value in the far-side signal $I_2$ and the clamp signal $I_c$) outputted from the clamping circuit 13, calculates an output ratio $(I_1/(I_1+I_{2c}))$, and outputs an output ratio signal representing the result thereof. The integrating circuit 15 inputs therein the output ratio signal and, together with an integrating capacitor 6 connected to the $C_{INT}$ terminal of the AFIC 10, accumulates the output ratio a plurality of times, thereby improving the S/N ratio. Thus accumulated output ratio is outputted from the $S_{OUT}$ terminal of the AFIC 10 as the AF signal. The CPU 1 inputs therein the AF signal outputted from the AFIC 10, converts the AF signal into a distance signal by carrying out a predetermined arithmetic operation, and sends out the resulting distance signal to a lens driving circuit 7. According to this distance signal, the lens driving circuit 7 causes a taking lens 8 to effect a focusing action.

Figure 6:
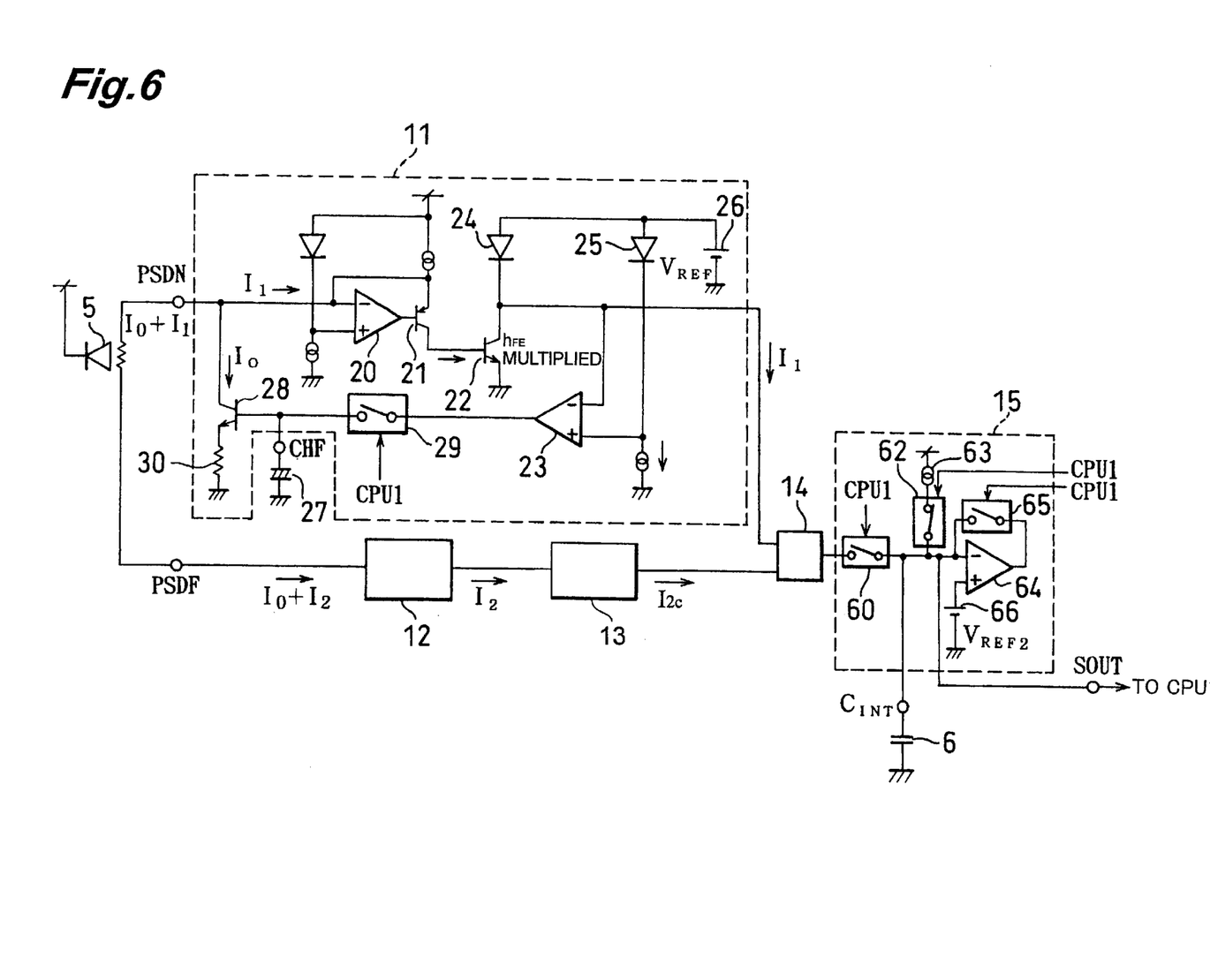
FIG. 6 is a circuit diagram of the first signal processing circuit and integrating circuit in the rangefinder apparatus in accordance with the above-mentioned embodiment.
Figure 7:
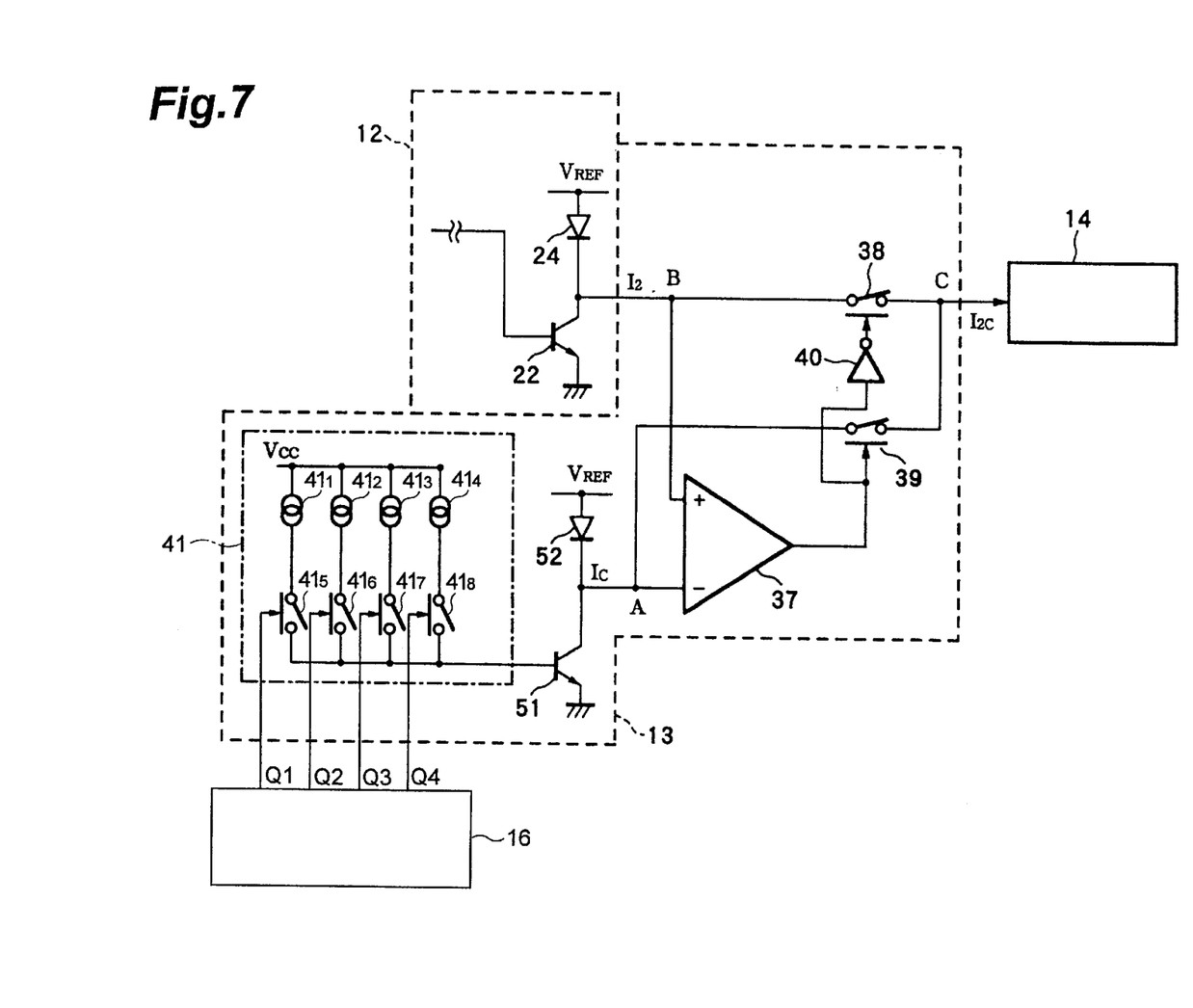
FIG. 7 is a circuit diagram of the clamping circuit in the rangefinder apparatus in accordance with the above-mentioned embodiment.

Specific respective circuit configurations of the first signal processing circuit 11, clamping circuit 13, integrating circuit 15, and clamp level switching circuit 16 in the AFIC 10 will now be explained. FIG. 6 is a circuit diagram of the first signal processing circuit 11 and integrating circuit 15 in the rangefinder apparatus in accordance with this embodiment. FIG. 7 is a circuit diagram of the clamp circuit 13 in the rangefinder apparatus in accordance with this embodiment. Here, the second signal processing circuit 12 has a circuit configuration similar to that of the first signal processing circuit 11.

The first signal processing circuit 11, whose circuit diagram is shown in FIG. 6, inputs therein the near-side signal I, with the steady-state light component $I_0$ outputted from the PSD 5, eliminates the steady-state light component $I_0$, and outputs the near-side signal $I_1$. The current $(I_1+I_0)$ outputted from the near-distance-side terminal of the PSD 5 is fed to the "−" input terminal of an operational amplifier 20 in the first signal processing circuit 11 by way of the PSDN terminal of the AFIC 10. The output terminal of the operational amplifier 20 is connected to the base terminal of a transistor 21, whereas the collector terminal of the transistor 21 is connected to the base terminal of a transistor 22. The collector terminal of the transistor 22 is connected to the "−" input terminal of an operational amplifier 23 and also to the arithmetic circuit 14. Further, the cathode terminal of a compression diode 24 is connected to the collector terminal of the transistor 22, whereas the cathode terminal of a compression diode 25 is connected to the "+" input terminal of the operational amplifier 23. A first reference power source 26 is connected to the respective anode terminals of the compression diodes 24 and 25.

Also, a steady-state light eliminating capacitor 27 is externally attached to the CHF terminal of the AFIC 10, and is connected to the base terminal of a steady-state light eliminating transistor 28 within the first signal processing circuit 11. The steady-state light eliminating capacitor 27 and the operational amplifier 23 are connected to each other by way of a switch 29, whose ON/OFF is controlled by the CPU 1. The collector terminal of the steady-state light eliminating transistor 28 is connected to the "−" input terminal of the operational amplifier 20, whereas the emitter terminal of the transistor 28 is grounded by way of a resistor 30.

The circuit diagram of the clamp circuit 13 is shown in FIG. 7. The "+" input terminal of a determination comparator 37 in the clamp circuit 13 is connected to the collector terminal of the transistor 22 in the second signal processing circuit 12, and to the input terminal of the arithmetic circuit 14 by way of a switch 38. On the other hand, the "−" input terminal of the determination comparator 37 is connected to the collector terminal of a transistor 51 as with the transistor 22 and compression diode 24 connected to the "+" input terminal thereof, and is also connected to the input terminal of the arithmetic terminal 14 by way of a switch 39.

Also, a clamp current source 41 is connected to the base terminal of the transistor 51. In this clamp current source 41, a constant current source $41_1$ and a switch $41_5$ are connected in series, a constant current source $41_2$ and a switch $41_6$ are connected in series, a constant current source $41_3$ and a switch $41_7$ are connected in series, and a constant current source $41_4$ and a switch $41_8$ are connected in series, whereas these four groups are connected in parallel. The constant current sources $41_1$, $41_2$, $41_3$, and $41_4$ output constant current values of 0.125 nA, 0.25 nA, 0.5 nA, and 1.0 nA, respectively. The switches $41_5$ to $41_8$ open and close under the control of their corresponding signals $Q_1$ to $Q_4$ outputted from the clamp level switching circuit 16. The clamp current source 41 inputs a clamp current, which is the total of the currents from the respective constant current sources corresponding to the closed switches, to the base terminal of the transistor 51. This clamp current becomes the base current of the transistor 51, and the collector potential corresponding to the magnitude thereof is fed to the "−" input terminal of the determination comparator 37.

The output terminal of the determination comparator 37 is connected to the switch 39, whereby the output signal of the former is inputted to the latter. Also, the output terminal of the determination comparator 37 is connected to the switch 38 by way of an inverter 40, whereby the output signal of the determination comparator 37 is inputted to the switch 38 after being inverted. Hence, the switches 38 and 39 have such a relationship therebetween that, if one of them is turned ON by the output signal from the determination comparator 37, the other is turned OFF.

The circuit configuration of the integrating circuit 15 is shown in FIG. 6. The integrating capacitor 6 externally attached to the $C_{INT}$ terminal of the AFIC 10 is connected to the output terminal of the arithmetic circuit 14 by way of a switch 60, to a constant current source 63 by way of a switch 62, to the output terminal of an operational amplifier 64 by way of a switch 65, and directly to the "−" input terminal of the operational amplifier 64, whereas the potential thereof is outputted from the $S_{OUT}$ terminal of the AFIC 10. The switches 60, 62, and 65 are controlled by control signals from the CPU 1. Also, a second reference power source 66 is connected to the "+" input terminal of the operational amplifier 64.

Figure 8:
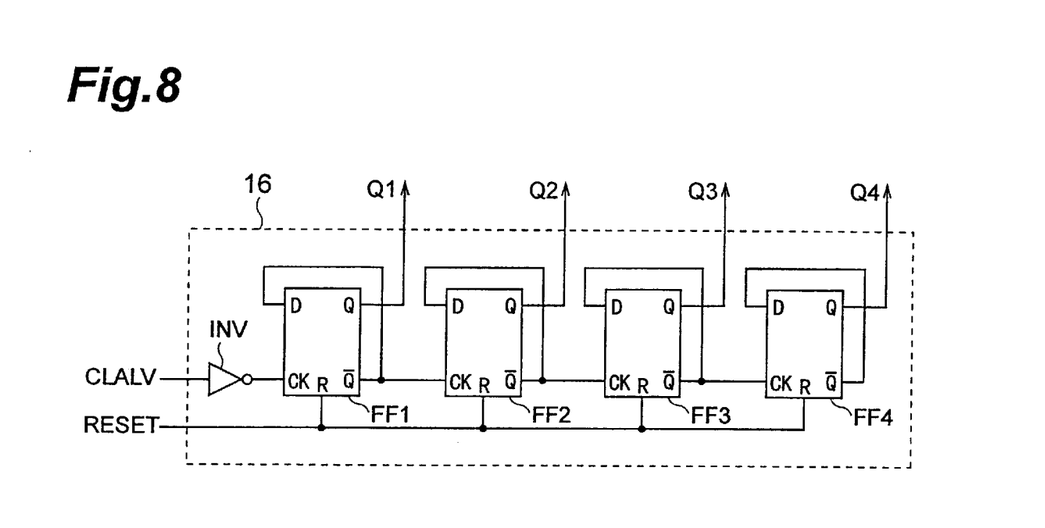
FIG. 8 is a circuit diagram of the clamp level switching circuit in the rangefinder apparatus in accordance with the above-mentioned embodiment.

FIG. 8 is a circuit diagram of the clamp level switching circuit 16 in the rangefinder apparatus in accordance with this embodiment. The clamp level switching circuit 16 is a 4-bit binary counter circuit constituted by an inverter INV and D-type flip-flops FF1 to FF4. The inverter INV inverts the CLALV signal outputted from the CPU 1. The CK input terminal of the D-type flip-flop FF1 is connected to the output terminal of the inverter INV. The CK input terminal of the D-type flip-flop FF2 is connected to the Q-inversion output terminal of the D-type flip-flop FF1. The CK input terminal of the D-type flip-flop FF3 is connected to the Q-inversion output terminal of the D-type flip-flop FF2. The CK input terminal of the D-type flip-flop FF4 is connected to the Q-inversion output terminal of the D-type flip-flop FF3. The D input terminal of each of the D-type flip-flops FF1 to FF4 is connected to its own Q-inversion output terminal. Each of the D-type flip-flops FF1 to FF4 is initialized by inputting the RESET signal outputted from the CPU 1 to the respective R input terminal. The clamp level switching circuit 16 counts the number of pulses of the CLALV signal outputted from the CPU 1, and outputs, as the result of counting, the 4-bit output ($Q_1$, $Q_2$, $Q_3$, $Q_4$) composed of the output values from the respective Q output terminals of the D-type flip-flops FF1 to FF4.

The outline of operations of thus configured AFIC 10 will now be explained with reference to FIGS. 2 and 3. When not causing the IRED 4 to emit light, the CPU 1 keeps the switch 29 of the first signal processing circuit 11 in its ON state. The steady-state light component $I_0$ outputted from the PSD 5 at this time is inputted to the first signal processing circuit 11, and is amplified as a current by the current amplifier constituted by the operational amplifier 20 and the transistors 21 and 22. Thus amplified signal is logarithmically compressed by the compression diode 24, so as to be converted into a voltage signal, which is then fed to the "−" input terminal of the operational amplifier 23. When the signal inputted to the operational amplifier 20 is higher, the cathode potential of the compression diode 24 becomes higher, thus increasing the signal outputted from the operational amplifier 23, whereby the capacitor 27 is charged. As a consequence, a base current is supplied to the transistor 28, so that a collector current flows into the transistor 28, whereby, of the signal $I_0$ fed into the first signal processing circuit 11, the signal inputted to the operational amplifier 20 decreases. In the state where the operation of this closed loop is stable, all of the signal $I_0$ inputted to the first signal processing circuit 11 flows into the transistor 28, whereby the charge corresponding to the base current at this time is stored in the capacitor 27.

When the CPU 1 turns OFF the switch 29 while causing the IRED 4 to emit light, of the signal $I_1+I_0$ outputted from the PSD 5 at this time, the steady-state light component $I_0$ flows as the collector current into the transistor 28 to which the base potential is applied by the charge stored in the capacitor 27, whereas the near-side signal $I_1$ is amplified as a current by the current amplifier constituted by the operational amplifier 20 and the transistors 21 and 22 and then is logarithmically compressed by the compression diode 24, so as to be converted into and outputted as a voltage signal. Namely, from the first signal processing circuit 11, the near-side signal $I_1$ is outputted alone after the steady-state light component $I_0$ is eliminated, and thus outputted near-side signal $I_1$ is inputted to the arithmetic circuit 14. From the second signal processing circuit 12, on the other hand, as with the first signal processing circuit 11, the far-side signal $I_2$ is outputted alone after the steady-state light component $I_0$ is eliminated, and thus outputted far-side signal $I_2$ is inputted to the clamping circuit 13.

The far-side signal $I_2$ inputted to the clamping circuit 13 is fed to the "+" input terminal of the determination comparator 37 in the clamping circuit 13. The clamp current outputted from the clamp current source 41 flows as a base current into the transistor 51, and its accompanying potential (clamp current $I_c$) at the collector terminal of the transistor 51 is inputted to the "−" input terminal of the determination comparator 37. The far-side signal $I_2$ and the clamp signal $I_c$ are compared with each other in terms of magnitude by the determination comparator 37. According to the result thereof, one of the switches 38 and 39 is turned ON, whereas the other is turned OFF. Namely, if the far-side signal $I_2$ is greater than the clamp signal $I_c$, then the switch 38 is turned ON, whereas the switch 39 is turned OFF, whereby the far-side signal $I_2$ is outputted as the output signal $I_{2c}$ of the clamping circuit 13. If their relationship in terms of magnitude is reversed, then the switch 38 is turned OFF, whereas the switch 39 is turned ON, whereby the clamp signal $I_c$ is outputted as the output signal $I_{2c}$ of the clamping circuit 13.

The signal $I_{2c}$ outputted from the clamping circuit 13 and the near-side signal $I_1$ outputted from the first signal processing circuit 11 are inputted to the arithmetic circuit 14, and the output ratio ($I_1/(I_1+I_{2c})$) is calculated by the arithmetic circuit 14 and is outputted to the integrating circuit 15. While the IRED 4 is emitting a predetermined number of pulses of light, the switch 60 of the integrating circuit 15 is kept in its ON state, whereas the switches 62 and 65 are turned OFF, whereby the output ratio signal outputted from the integrating circuit 14 is stored in the integrating capacitor 6 (first integration). When a predetermined number of pulse light emissions are completed, then the switch 60 is turned OFF, whereas the switch 65 is turned ON, whereby the charge stored in the integrating capacitor 6 is reduced by the charge having an opposite potential supplied from the output terminal of the operational amplifier 64 (second integration). The CPU 1 monitors the potential of the integrating capacitor 6, so as to measure the time required for regaining the original potential, and determines the AF signal according to thus measured time, thereby determining the distance to the object. Further, according to thus determined distance to the object, the CPU 1 determines the amount of extension of the taking lens 8, and causes, by way of the lens driving circuit 7, the taking lens 8 to effect an focusing action.

Figure 9:
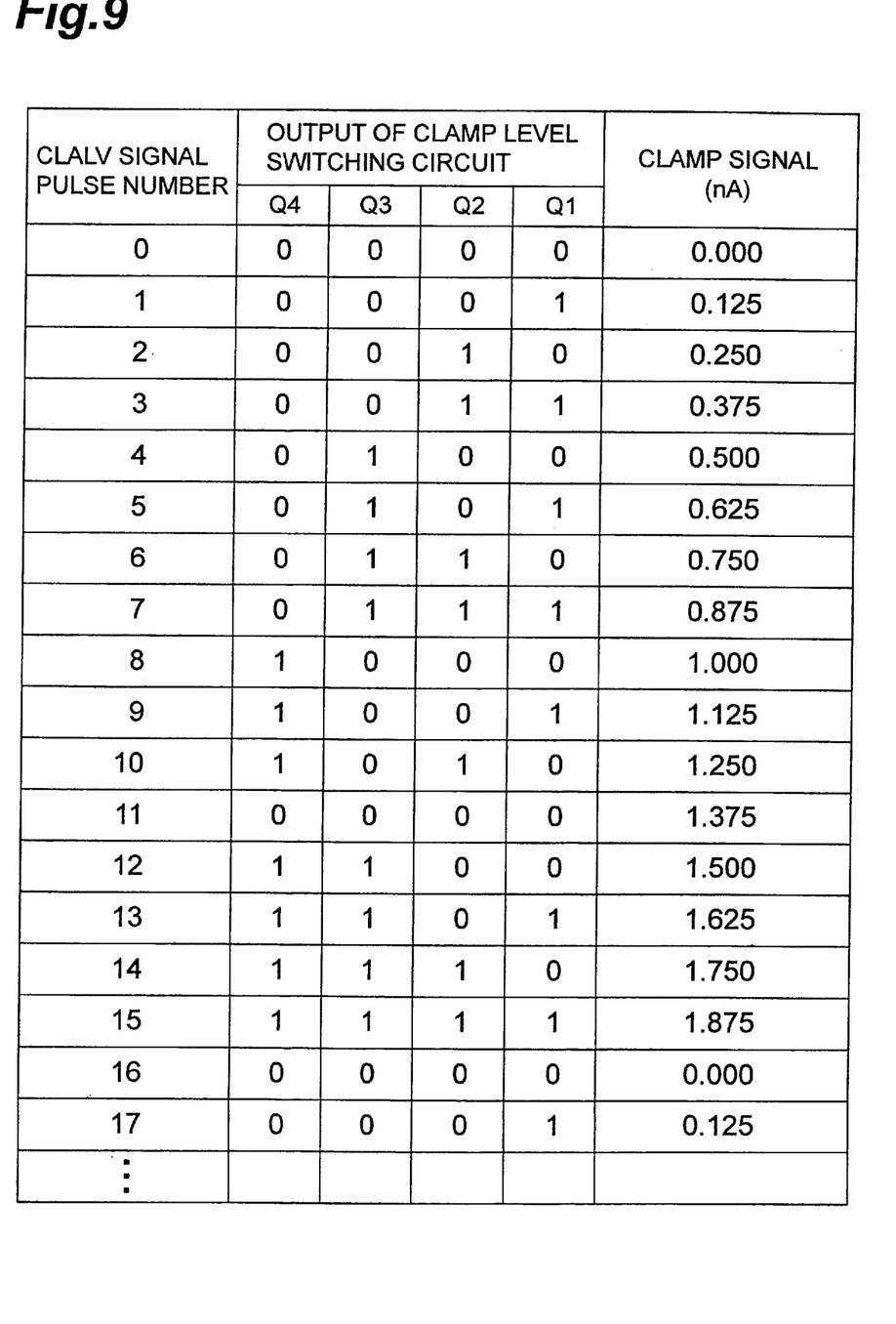
FIG. 9 is a chart for explaining operations of the clamp level switching circuit in the rangefinder apparatus in accordance with the above-mentioned embodiment.

Clamp level switching operations in the rangefinder apparatus in accordance with this embodiment will now be explained. FIG. 9 is a chart for explaining operations of the clamp level switching circuit 16 in the rangefinder apparatus in accordance with this embodiment. As shown in this chart, the clamp level switching circuit 16 increases the 4-bit output ($Q_4, Q_3, Q_2, Q_1$) by 1 each time a pulse of the CLALV signal is inputted from the CPU 1. Also, if 1 pulse of the CLALV signal is inputted when the 4-bit output ($Q_4, Q_3, Q_2, Q_1$) of the clamp level switching circuit 16 is (1, 1, 1, 1), then the 4-bit output shifts to (0, 0, 0, 0). Then, according to the value of the 4-bit output ($Q_4, Q_3, Q_2, Q_1$) of the clamp level switching circuit 16, the individual switches $41_5$ to $41_8$ in the clamp current source 41 in the clamping circuit 13 open and close, thereby setting the level of the clamp signal $I_c$.

Figure 10A:
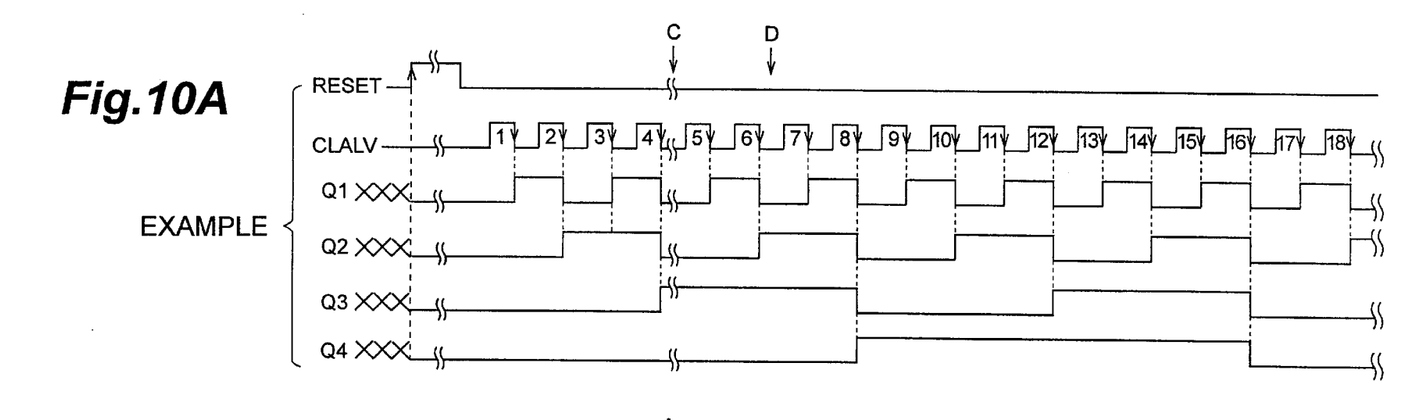
FIGS. 10A and 10B are timing charts for explaining the operations of the clamp level switching circuit in the rangefinder apparatus in accordance with the above-mentioned embodiment; and, FIGS. 11A and 11B are timing charts for explaining continuous distance measuring operations of the rangefinder apparatus in accordance with the above-mentioned embodiment.
Figure 10B:
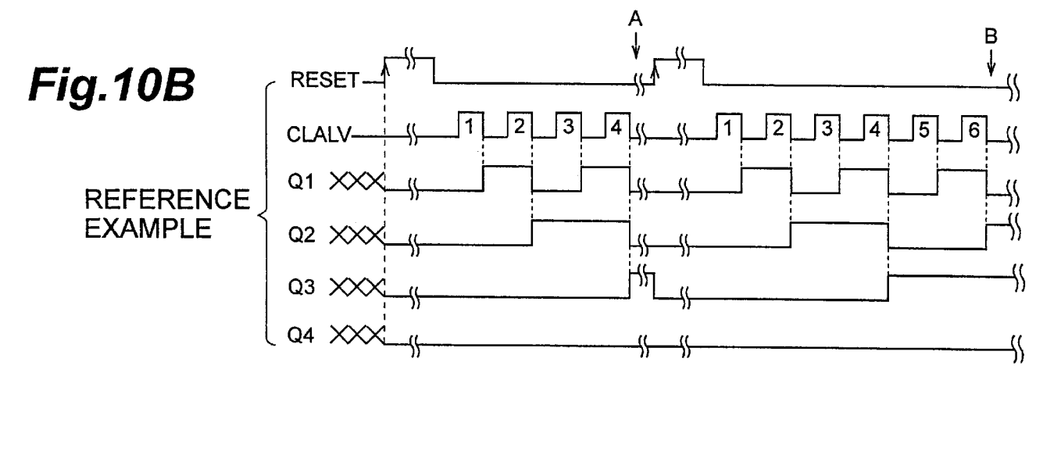

FIGS. 10A and 10B are timing charts for explaining the operations of the clamp level switching circuit 16 in the rangefinder apparatus in accordance with this embodiment. These charts show an example and a reference example each in the case where the clamp signal level is initially set to 0.500 nA and then to 0.750 nA.

The clamp level switching circuit 16 shown as the reference example in FIG. 10B operates as follows. The RESET signal is inputted from the CPU 1 to the clamp level switching circuit 16, thereby initializing the 4-bit output ($Q_4, Q_3, Q_2, Q_1$) of the clamp level switching circuit 16. Then, 4 pulses of the CLALV signal are inputted from the CPU 1 to the clamp level switching circuit 16, so as to shift the 4-bit output ($Q_4, Q_3, Q_2, Q_1$) of the clamp level switching circuit 16 to (0, 1, 0, 0), thereby setting the level of the clamp signal $I_c$ to 0.500 nA (point A in the chart). For setting the clamp signal level to 0.750 nA thereafter, the RESET signal is inputted from the CPU 1 to the clamp signal switching circuit 16 again, so as to initialize the 4-bit output ($Q_4, Q_3, Q_2, Q_1$) of the clamp level switching circuit 16. Then, 6 pulses of the CLALV signal are inputted from the CPU 1 to the clamp level switching circuit 16, so as to shift the 4-bit output ($Q_4, Q_3, Q_2, Q_1$) of the clamp level switching circuit 16 to (0, 1, 1, 0), thereby setting the level of the clamp signal $I_c$ to 0.750 nA (point B in the chart).

On the other hand, the clamp level switching circuit 16 shown as the example in FIG. 10A operates as follows. The RESET signal is inputted from the CPU 1 to the clamp level switching circuit 16, so as to initialize the 4-bit output ($Q_4, Q_3, Q_2, Q_1$) of the clamp level switching circuit 16. Then, 4 pulses of the CLALV signal are inputted from the CPU 1 to the clamp level switching circuit 16, so as to shift the 4-bit output ($Q_4, Q_3, Q_2, Q_1$) of the clamp level switching circuit 16 to (0, 1, 0, 0), thereby setting the level of the clamp signal $I_c$ to 0.500 nA (point C in the chart). For setting the clamp signal level to 0.750 nA thereafter, without inputting the RESET signal again, i.e., without initializing the 4-bit output ($Q_4, Q_3, Q_2, Q_1$) of the clamp level switching circuit 16, 2 pulses of the CLALV signal are inputted from the CPU 1 to the clamp level switching circuit 16, so as to shift the 4-bit output of the clamp level switching circuit 16 to (0, 1, 1, 0), thereby setting the level of the clamp signal $I_c$ to 0.750 nA (point D in the chart).

The reference example and the example are compared with each other as follows. When switching the level of the clamp signal $I_c$ from 0.500 nA to 0.750 nA in the reference example, 6 pulses of the CLALV signal are inputted to the clamp level switching circuit 16 after the latter is initialized by inputting the RESET signal. In the example, on the other hand, without inputting the RESET signal, 2 pulses of the CLALV signal are immediately inputted, so as to add only 2 to the 4-bit output of the clamp level stitching circuit 16. Therefore, the time required for the clamp level switching is shorter in the example than in the reference example.

Here, when switching the level of the clamp signal $I_c$ from 0.750 nA to 0.50 nA in the reverse manner in the example, 14 pulses of the CLALV signal are immediately inputted to the clamp level switching circuit 16 without inputting the RESET signal. In general, however, while about several tens of milliseconds are needed for the pulse width of RESET signal, several tens of microseconds are sufficient for the period of CLALV signal. Therefore, the time required for clamp level switching is shorter in the example than in the reference example in this case as well.

Figure 11A:
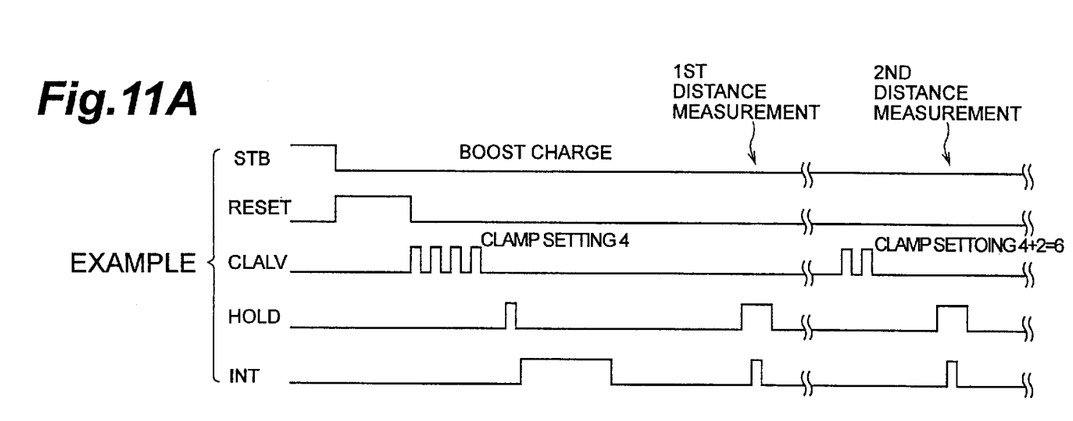
Figure 11B:
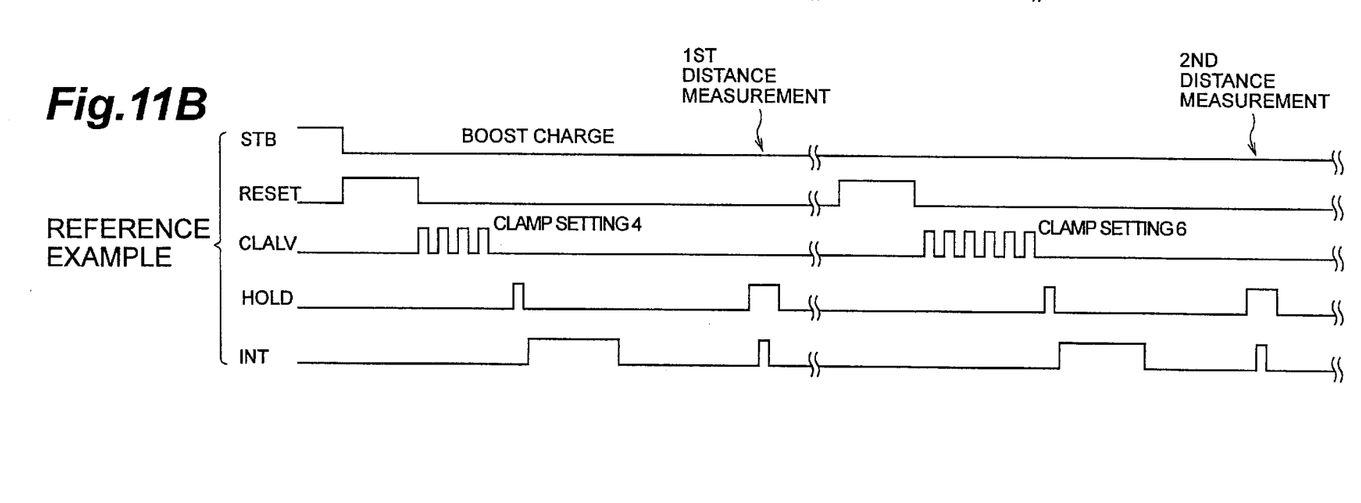

FIGS. 11A and 11B are timing charts for explaining operations in a continuous distance measurement in the rangefinder apparatus in accordance with this embodiment. These charts show an example and a reference example each in the case where the clamp signal level is set to 0.500 nA before the first distance measuring operation in the continuous distance measurement and then to 0.750 nA before the second distance measuring operation.

Here, each of the STB signal, HOLD signal, and INT signal shown in these charts is a control signal supplied from the CPU 1 to the AFIC 10. At high and low levels, the STB signal sets the AFIC 10 to its standby state and operable state, respectively. The RESET signal initializes the clamp level switching circuit 16 at its rising edge, and overcharges the integrating circuit 6 with a power source voltage $V_{cc}$.

The control functions of the HOLD signal and INT signal are as follows. From the time when the resetting is cleared (at the falling edge of the RESET signal) until the initial rising edge of the INT signal, the integrating capacitor 6 is preliminarily charged with a reference voltage $V_{REF}$. From the first nitial rising edge of the INT signal after clearing the resetting until the falling edge thereof, the steady-state light eliminating capacitor 27 is preliminarily charged. After clearing the resetting, during the period when the HOLD signal is at its HIGH level, the steady-state light component is held by the steady-state light eliminating capacitor 27. After clearing the resetting, during the period when the HOLD signal is at its HIGH level and the INT signal is also at its HIGH level, accumulation is carried out in the integrating capacitor 6. Also, after clearing the resetting, during the period when the HOLD signal is at its LOW level and the INT signal is at its HIGH level, second integration is carried out.

The rangefinder apparatus shown as the reference example in FIG. 11B operates as follows. When the STB signal falls down and the RESET signal rises up, the clamp level switching circuit 16 is initialized, and the integrating capacitor 6 is overcharged with the power source voltage $V_{cc}$ during the period (several tens of milliseconds) when the RESET signal is at its HIGH level. Then, during the period from the falling edge of the RESET signal until the first rising edge of the INT signal, the integrating capacitor 6 is preliminarily charged with the reference voltage $V_{REF}$, and 4 pulses of the CLALV signal are inputted to the clamp level switching circuit 16. As a result, the 4-bit output of the clamp level switching circuit 16 becomes (0, 1, 0, 0), whereby the level of the clamp signal $I_c$ is set to 0.500 nA. Thereafter, the first distance measuring operation is carried out by respective repetitive pulses of the HOLD signal and INT signal.

After the first distance measuring operation is completed, the clamp signal level is set to 0.750 nA before the second distance measuring operation. At this time, the RESET signal is inputted to the clamp level switching circuit 16 again, so as to initialize the 4-bit output ($Q_4$, $Q_3$, $Q_2$, $Q_1$) of the clamp level switching circuit 16. Then, during the period from the falling edge of the RESET signal until the next rising edge of the INT signal, 6 pulses of the CLALV signal are inputted to the clamp level switching circuit 16. As a result the 4-bit output of the clamp level switching circuit 16 becomes (0, 1, 1, 0), whereby the level of the clamp signal $I_c$ is set to 0.750 nA. Thereafter, the second distance measuring operation is carried out by respective repetitive pulses of the HOLD signal and INT signal.

On the other hand, the rangefinder apparatus shown as the example in FIG. 11A operates as follows. Its operation until the first distance measuring operation is similar to that in the case of the above-mentioned reference example. In the example, for setting the clamp signal level to 0.75 nA before the second distance measuring operation, the RESET signal is not inputted to the clamp level switching circuit 16 again, and the 4-bit output ($Q_4$, $Q_3$, $Q_2$, $Q_1$) of the clamp level switching circuit 16 is not initialized. Then, 2 pulses of the CLALV signal are immediately inputted to the clamp level switching circuit 16. As a result, the 4-bit output of the clamp level switching circuit 16 becomes (0, 1, 1, 0), whereby the level of the clamp signal $I_c$ is set to 0.750 nA. Thereafter, the second distance measuring operation is carried out by respective repetitive pulses of the HOLD signal and INT signal.

The reference example and the example are compared with each other as follows. In the reference example, when switching the level of the clamp signal $I_c$ from 0.500 nA for the first distance measuring operation to 0.750 nA for the second distance measuring operation, before starting the second distance measuring operation after the first distance measuring operation is completed, 6 pulses of the CLALV signal are inputted to the clamp level switching circuit 16 after the latter is initialized by inputting the RESET signal, and the INT signal is further inputted. In the example, on the other hand, without inputting the RESET signal and INT signal, 2 pulses of the CLALV signal are inputted, so as to add only 2 to the 4-bit output of the clamp level switching circuit 16. Therefore, the time required for the clamp level switching, i.e., the time required for the continuous distance measurement, is shorter in the example than in the reference example.

The present invention is not limited to the aforementioned embodiments and many modifications can be made thereto. For example, the invention is also applicable to a system including such an integrating circuit, in which charging and discharging of an integrating capacitor are carried out in a manner contrary to that in the aforementioned embodiments. That is, during the period of the first integration, the integrating capacitor 6 is charged so that the voltage level thereof ascends step by step and then discharged at a time in the second integration.

While the distance to the object is obtained on the basis of the time needed in the second integral, it may also be obtained on the basis of the result of the A/D conversion of the integral voltage value obtained by the first integral, namely, the voltage value which is reduced due to the discharge of integral capacitor or the voltage value which is increased due to the charge of integral capacitor.

In accordance with the present invention, as explained in detail in the foregoing, the clamp level switching means adds a predetermined level to an already set value so as to set a new level when switching the level of the clamp signal before the second or later distance measuring operation in a continuous distance measurement in which a plurality of distance measuring operations are carried out. Namely, when switching the clamp signal level, it is unnecessary to set the clamp signal level again after initializing it. Therefore, the time required for switching the clamp signal level, i.e., the time required for the continuous distance measurement, is short, whereby the time difference required for the period from the release operation until the exposure is short even in the continuous distance measurement.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A rangefinder apparatus comprising:

light-projecting means for projecting a luminous flux toward an object at a distance to be measured;

light-detecting means for detecting reflected light of the luminous flux projected toward the object at a light-detecting position on a position sensitive detector corresponding to the distance to the object and outputting, according to said light-detecting position, a far-side signal having a larger value as the distance increases if the light detected is constant, and a near-side signal having a larger value as the distance decreases if the light detected is constant;

clamping means for receiving the far-side signal, comparing magnitude of the far-side signal to a magnitude of a clamp signal, and outputting the far-side signal without change if the magnitude of the far-side signal is at least equal to the magnitude of the clamp signal and outputting the clamp signal if the magnitude of the far-side signal is less than the magnitude of the clamp signal;

arithmetic means for calculating a ratio between the near-side signal and the signal output from said clamping means and outputting the ratio as a ratio signal;

integrating means for accumulating and integrating the ratio signal and outputting an integrated signal corresponding to integration of the ratio signal;

detecting means for detecting a measured distance according to the integrated signal; and clamp level switching means for adding a value when switching the magnitude of the clamp signal before a subsequent second distance measuring operation in a continuous distance measurement in which a plurality of distance measuring operations are carried out in series.

2. The rangefinder apparatus according to claim 1, wherein said light-projecting means is an infrared light-emitting diode.

3. The rangefinder apparatus according to claim 1, wherein said arithmetic means and said integrating means are part of a single autofocus integrated circuit.

* * * * *